US009049337B2

(12) United States Patent
Kang

(10) Patent No.: US 9,049,337 B2
(45) Date of Patent: Jun. 2, 2015

(54) MOBILE COMMUNICATION TERMINAL FOR PROVIDING RADIO FREQUENCY IDENTIFICATION SERVICE INTERWORKING WITH VIDEO TELEPHONY AND METHOD THEREOF

(75) Inventor: Min-Cheol Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1161 days.

(21) Appl. No.: 12/258,868

(22) Filed: Oct. 27, 2008

(65) Prior Publication Data

US 2009/0109277 A1 Apr. 30, 2009

(30) Foreign Application Priority Data

Oct. 26, 2007 (KR) ........................ 10-2007-0108270

(51) Int. Cl.
*H04N 7/14* (2006.01)
*H04M 1/725* (2006.01)

(52) U.S. Cl.
CPC ............. *H04N 7/147* (2013.01); *H04M 1/7253* (2013.01)

(58) Field of Classification Search
USPC ......... 348/14.02, 14.04, 590, E07.078, 14.01, 348/14.09, 554, E7.078, 460
See application file for complete search history.

(56) References Cited

U.S. PATENT DOCUMENTS

| | | | | |
|---|---|---|---|---|
| 7,606,162 | B2* | 10/2009 | Herter et al. | 370/241 |
| 7,639,138 | B2* | 12/2009 | Chang | 340/572.1 |
| 7,920,158 | B1* | 4/2011 | Beck et al. | 348/14.08 |
| 2006/0146131 | A1 | 7/2006 | Nou | |
| 2006/0199533 | A1* | 9/2006 | Zilliacus et al. | 455/41.2 |
| 2007/0069852 | A1* | 3/2007 | Mo et al. | 340/5.1 |
| 2008/0182570 | A1* | 7/2008 | Kuhl | 455/422.1 |

FOREIGN PATENT DOCUMENTS

| | | | |
|---|---|---|---|
| KR | 10-2006-0055277 | A | 5/2006 |
| KR | 10-2006-0066764 | A | 6/2006 |
| KR | 10-2006-0070274 | A | 6/2006 |
| KR | 10-2006-0094548 | A | 8/2006 |

* cited by examiner

*Primary Examiner* — Yosef K Laekemariam
(74) *Attorney, Agent, or Firm* — Jefferson IP Law, LLP

(57) ABSTRACT

A mobile communication terminal for providing a Radio Frequency IDentification (RFID) service interworking with video telephony and a method thereof are provided. The mobile communication system includes a first mobile communication terminal for generating RFID service information by using RFID tag information and for transmitting the generated information to a second mobile communication terminal, and the second mobile communication terminal for parsing the RFID service information received from the first mobile communication terminal and for outputting the parsed RFID service information.

18 Claims, 5 Drawing Sheets

MOBILE COMMUNICATION TERMINAL FOR PROVIDING RADIO FREQUENCY IDENTIFICATION SERVICE INTERWORKING WITH VIDEO TELEPHONY AND METHOD THEREOF

PRIORITY

This application claims the benefit under 35 U.S.C. §119(a) of a Korean patent application filed in the Korean Intellectual Property Office on Oct. 26, 2007 and assigned Serial No. 10-2007-0108270, the entire disclosure of which is hereby incorporated by reference.

BACKGROUND OF THE INVENTION

1. Field of the Invention

The present invention relates to a Radio Frequency IDentification (RFID) mobile terminal capable of performing video telephony. More particularly, the present invention relates to a mobile communication terminal for providing an RFID service interworking with video telephony and a method thereof.

2. Description of the Related Art

Recently, due to the advances in mobile communication technologies, a Code Division Multiple Access (CDMA) mobile communication system provides not only conventional voice services but also multimedia communication services for transmitting data such as circuit data or packet data.

In addition, with rapid developments in information communications technologies, International Mobile Telecommunication 2000 (IMT-2000) is being commercialized as a third generation (3G) mobile communication system standardized by the International Telecommunication Union-Radio communications (ITU-R). The IMT-2000 can provide a wireless Internet service at a data rate of up to 144 Kbps which is much faster than the existing data rate (i.e., 14.4 Kbps or 56 Kbps) supported in conventional IS-95A and IS-95B networks. The IS-95C network evolved from the conventional IS-95A and IS-95B networks is used in IMT-2000 (e.g., CDMA 2000 1X, 3X, EVolution-Data Only (EV-DO), Wideband CDMA (WCDMA), etc.) systems. More particularly, the use of IMT-2000 services results in improvement in the quality of conventional voice services and Wireless Application Protocol (WAP) services. In addition, various multimedia services (Audio On Demand (AOD), Video On Demand (VOD), etc.,) can be provided at a faster speed.

As the capability of communication services increases, a video telephony system has become greatly popular. The video telephony system is implemented with hardware and software components capable of processing video and audio information on a real time basis so that users can communicate with each other while watching images of their counterparts at a long distance. The video telephony system can be used in various fields. For example, in a business field where conferences are important, work efficiency can be improved by avoiding frequent business trips and also management efficiency can be maximized with rapid decision making. Further, there are additional advantages in that information can be accurately delivered between users, users can communicate with each other from a long distance without feeling sense of a distance, and latest international information can be smoothly exchanged. In a medical field, the video telephony system can be used in patient management, remote treatment, etc. In an educational field, the video telephony system can be used in a remote education, etc.

According to services provided by the video telephony system, users of mobile communication terminals equipped with a camera module can communicate with their counterparts while watching images transmitted from the counterparts. Such a video telephony service can be provided to a subscriber of a mobile communication service with the commercialization of a mobile communication network (e.g., CDMA 1x EV-DO, and WCDMA) capable of high-speed packet data communication. The video telephony service is provided based on a WCDMA 3G-324M or CDMA H.323 and a Session Initiation Protocol (SIP). Unlike the conventional voice call, video and audio data can be simultaneously transmitted.

Meanwhile, there is an emerging wireless Internet service by which mobile communication subscribers can use the Internet anywhere via a wireless network while moving one place to another. Accordingly, the mobile communication subscribers can communicate with their counterparts anytime anywhere while moving from one place to another by using the voice call service. In addition, after accessing to the Internet by using the wireless Internet service, the mobile communication subscribers can receive various contents (e.g., games, chatting, stock, financial transaction, news, weather, sports, traffic information, etc.) in various formats such as text, voice, image, etc.

More particularly, there are regularized daily living services in which all purchase processes from product information to payments can be done by using one mobile communication terminal, and in which a short-distance communication technology (e.g., Radio Frequency IDentification (RFID)) are integrated. The RFID is a technique in which a product item is attached with an RFID tag that includes information on the product item and in which the information is retrieved by a device using a Radio Frequency (RF). A recognizable distance is less than about 50 cm when using a barcode. However, when using the RFID, the recognizable distance can be extended to about 27 m according to a frequency band. According to an RFID mobile communication terminal, a product can be authenticated by accessing to an Internet site of a manufacturer of the product by using an identification code, wherein minimum information on the identification code is stored in an RFID tag.

Since a variety of information can be immediately recognized over the wireless Internet when using the RFID mobile communication terminal, it is expected that a wireless Internet market is revitalized. For example, customers can immediately authenticate luxury handbags, high-end liquors, etc., through the wireless Internet by using the RFID mobile communication terminal applied with the RFID technology. Further, manufacturers can minimize a sales reduction caused by fake products. In addition, mobile communication industries are expected to face a new phase in development since a process of authenticating products may have an effect on the growing demand on the wireless Internet.

In a current 3G-324M-based video telephony system, only video and audio information of a counterpart is transmitted to during a call. Thus, the user cannot be aware of a specific object image transmitted by the counterpart.

In a current situation where a 3G environment prevails and an RFID technology (e.g., RFID electronic tags) is spread, the user of the video telephony system integrated with the RFID technology can transfer a specific object image to the counterpart while shopping or the like, but cannot deliver additional information except for the image itself.

Accordingly, there is a need for a system capable of sharing product information with customers as well as manufacturers in addition to distribution of the RFID mobile communication terminal.

SUMMARY OF THE INVENTION

An aspect of the present invention is to address at least the above-mentioned problems and/or disadvantages and to provide at least the advantages described below. Accordingly, an aspect of the present invention is to provide a mobile communication terminal for providing a Radio Frequency IDentification (RFID) service interworking with video telephony, whereby a user of a video telephony system integrated with an RFID technology can deliver additional information in addition to information on an object image to be viewed by a counterpart while shopping or the like, and a method thereof.

Another aspect of the present invention is to provide a mobile communication terminal for providing an RFID service interworking with video telephony, whereby not only video and audio information of a counterpart but also information on a specific object image transmitted by the counterpart can be transmitted to a user during a call is in progress in a 3G-324M-based video telephony system, and a method thereof.

In accordance with an aspect of the present invention, a mobile communication system for providing an RFID service interworking with video telephony is provided. The mobile communication system includes a first mobile communication terminal for generating RFID service information by using RFID tag information and for transmitting the generated information to a second mobile communication terminal, and the second mobile communication terminal for parsing the RFID service information received from the first mobile communication terminal and for outputting the parsed RFID service information.

In accordance with another aspect of the present invention, a method of transmitting information obtained using an RFID during video telephony to a second mobile communication terminal currently participating in the video telephony is provided. The method includes performing an RFID service capable of sharing RFID information obtained during the video telephony, generating the obtained RFID information as transmittable RFID service information, and transmitting the generated RFID service information to the second mobile communication terminal.

In accordance with another aspect of the present invention, a mobile communication terminal for transmitting information obtained using an RFID during video telephony to a second mobile communication terminal currently participating in the video telephony is provided. The mobile communication terminal includes an RFID module for receiving RFID tag information, and a controller for performing an RFID service capable of sharing the RFID information obtained during the video telephony, for generating the obtained RFID information as transmittable RFID service information, and for transmitting the generated RFID service information to the second mobile communication terminal.

In accordance with another aspect of the present invention, a method of receiving RFID service information transmitted from a second mobile communication terminal participating in video telephony is provided. The method includes performing an RFID service capable of sharing the RFID service information of the second mobile communication terminal, receiving the RFID service information transmitted from the second mobile communication terminal, parsing the received RFID service information, and outputting the parsed RFID service information.

In accordance with another aspect of the present invention, a mobile communication terminal for receiving RFID service information transmitted from a second mobile communication terminal participating in video telephony is provided. The mobile communication terminal includes a controller for performing an RFID service capable of sharing the RFID service information of the second mobile communication terminal, for receiving the RFID service information transmitted from the second mobile communication terminal, and for parsing and outputting the RFID service information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. Also, descriptions of well-known functions and constructions will be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
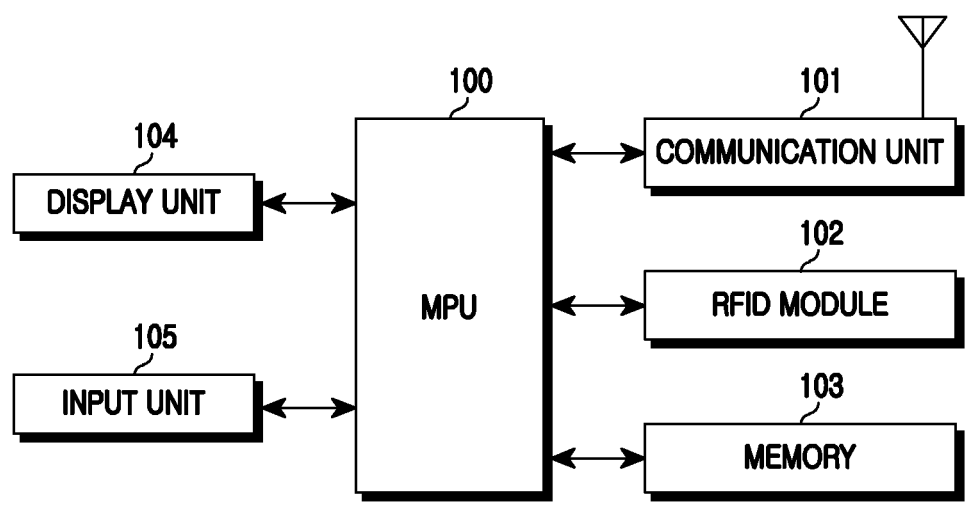
FIG. 1 is a block diagram illustrating a structure of a mobile communication terminal for providing caller information according to an exemplary embodiment of the present invention.

FIG. 1 is a block diagram illustrating a structure of a mobile communication terminal for providing caller information according to an exemplary embodiment of the present invention.

Referring to FIG. 1, the mobile communication terminal includes a Micro Processor Unit (MPU) 100, a communication unit 101, a Radio Frequency IDentification (RFID) module 102, a memory 103, a display unit 104, and an input unit 105.

The MPU 100 provides overall controls to the mobile communication terminal. For example, a voice call or a data communication is processed and controlled by the MPU 100. Further, the MPU 100 provides controls so that RFID information obtained by the RFID module 102 to be described below is obtained while a video telephony call is made between mobile communication terminals and is transmitted to a mobile communication service network. The MPU 100 also provides controls so that the RFID information received by a counterpart mobile communication terminal is evaluated and output. The MPU 100 parses the collected RFID information while the video telephony call is in progress with the counterpart mobile communication terminal and then converts the RFID information into information to be transmitted to the counterpart mobile communication terminal. Further, the MPU 100 analyzes RFID service information transmitted from the counterpart mobile communication terminal and then generates information to be output to the display unit 104.

Explanations of conventional operations and controls of the MPU 100 will be omitted in the following description.

The communication unit 101 transmits/receives a Radio Frequency (RF) signal of data that is input/output through an antenna. For example, in a transmitting process, data to be transmitted is subject to a channel-coding process and a spreading process, and then the data is transformed to an RF signal. In a receiving process, the RF signal is received and transformed to a base-band signal, and the base-band signal is subject to a de-spreading process and a channel-decoding process, thereby restoring the data. According to an exemplary embodiment of the present invention, the communication unit 101 transmits/receives RFID information obtained from the RFID module 102 to be described below to the wireless network under the control of the MPU 100.

The RFID module 102 receives information on an RFID tag, collects data, and stores the data in an internal memory. The RFID tag serves to collect the output RFID information by using energy generated by the RFID module 102 as a power source.

The memory 103 includes a Read Only Memory (ROM), a Random Access Memory (RAM), and a flash ROM. The ROM stores a microcode of programs, by which the MPU 100 is processed and controlled, and a variety of reference data.

The RAM is a working memory of the MPU 100 and stores temporary data that is generated while programs are performed. The flash ROM stores rewritable data, such as phonebook entries, outgoing messages, incoming messages, and the like.

The display unit 104 displays information such as state information, which is generated while the mobile communication terminal operates, limited numeral characters, large-sized moving and still pictures, and the like. The display unit 104 may be a color Liquid Crystal Display (LCD). Further, the display unit 104 of the mobile communication terminal outputs not only an image for the video telephony but also information obtained by the RFID module 102 from the RFID tag. Furthermore, the display unit 104 outputs the RFID information, which is obtained by the RFID module 102 and transmitted by the counterpart mobile communication terminal, while the video telephony call is in progress with the counterpart mobile communication terminal.

The input unit 105 includes a plurality of function keys such as numeral key buttons of '0' to '9', a menu button, a cancel (or delete) button, a confirm button, a talk button, an end button, an Internet access button, a navigation (or direction) key button, and a character input key. Key input data, which is input when the user presses these keys, is provided to the MPU 100.

Hereinafter, a process of sharing RFID service information while a video telephony call is in progress between mobile communication terminals according to an exemplary embodiment of the present invention will be described.

Figure 2:
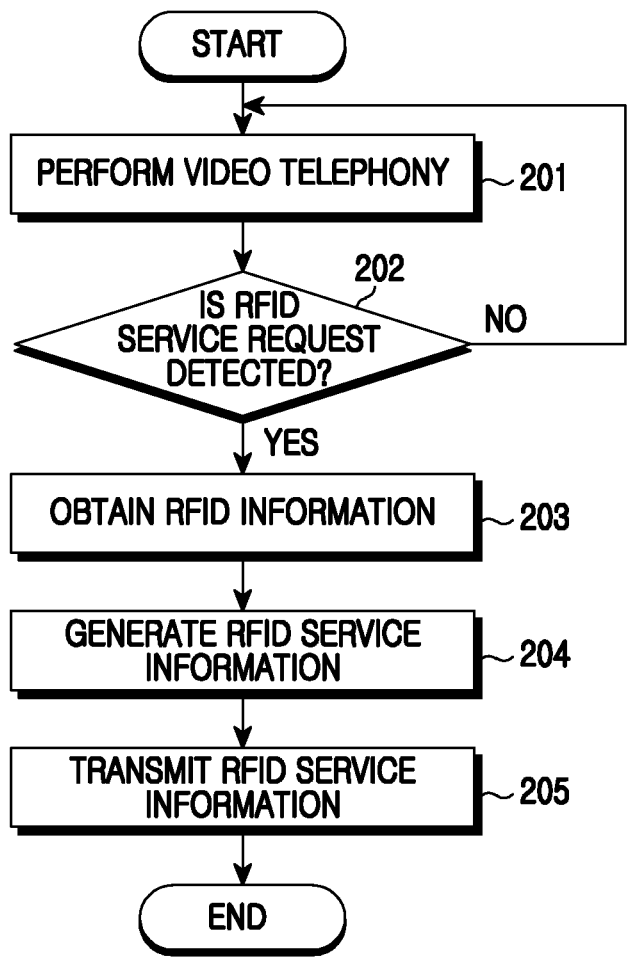
FIG. 2 is a flowchart illustrating a process of transmitting Radio Frequency IDentification (RFID) service information in a transmitting mobile communication terminal according to an exemplary embodiment of the present invention.

FIG. 2 is a flowchart illustrating a process of transmitting RFID service information in a transmitting mobile communication terminal according to an exemplary embodiment of the present invention.

Referring to FIG. 2, the transmitting mobile communication terminal performs video telephony with a receiving mobile communication terminal in step 201. Since the video telephony process of the mobile communication terminals is well known, detailed description thereof will be omitted.

In step 202, the transmitting mobile communication terminal determines whether an RFID service request is detected. The RFID service request is a service for providing RFID information (e.g., product information, travel information, etc.) to the receiving mobile communication terminal during the video telephony.

If the RFID service request is not detected, the transmitting mobile communication terminal returns to step 201.

In contrast, if the RFID service request is detected, the transmitting mobile communication terminal obtains the RFID information by using the RFID module of FIG. 1 in step 203, and then parses the RFID information into RFID service information to be transmitted to the receiving mobile communication terminal in step 204.

In step 205, the transmitting mobile communication terminal transmits the parsed RFID service information to the receiving mobile communication terminal. In this case, the transmitting mobile communication terminal may transmit the RFID service information to the receiving mobile communication terminal by using a specific message. For example, the RFID service information may be included in an H.245 User Input Indication (UII) message when transmitted.

Thereafter, the procedure of FIG. 2 ends.

Figure 3:
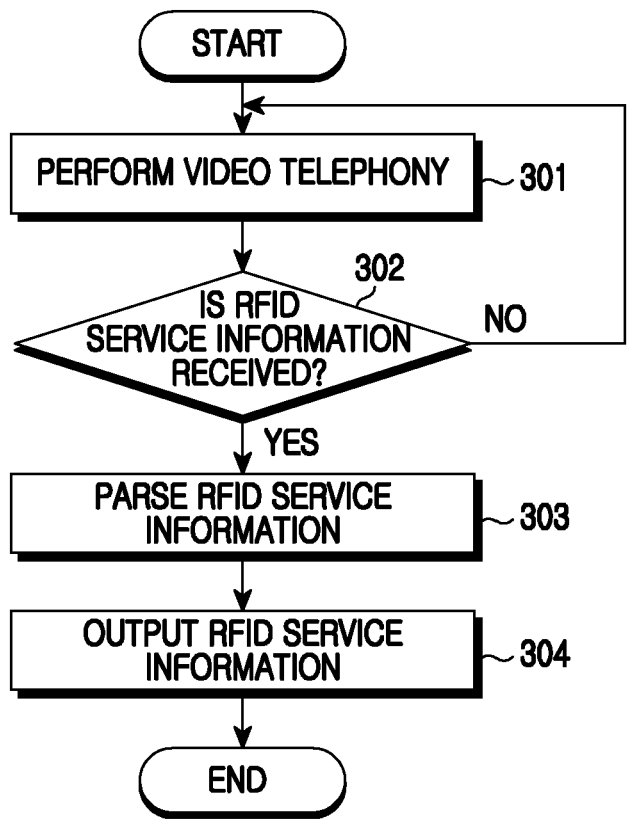
FIG. 3 is a flowchart illustrating a process of receiving RFID service information in a receiving mobile communication terminal according to an exemplary embodiment of the present invention.

FIG. 3 is a flowchart illustrating a process of receiving RFID service information in a receiving mobile communication terminal according to an exemplary embodiment of the present invention.

Referring to FIG. 3, the receiving mobile communication terminal performs video telephony with a transmitting mobile communication terminal in step 301, and then determines whether RFID service information is received from the transmitting mobile communication terminal in step 302.

If the RFID service information is not received, the receiving mobile communication terminal returns to step 301.

In contrast, if the RFID service information is received, the receiving mobile communication terminal parses the received RFID service information in step 303. For example, the receiving mobile communication terminal may provide control so that the received RFID service information is converted into one of a text file, a Hyper Text Markup Language (HTML) file, and the like.

In step 304, the receiving mobile communication terminal outputs the RFID service information. Thereafter, the procedure of FIG. 3 ends.

Figure 4:
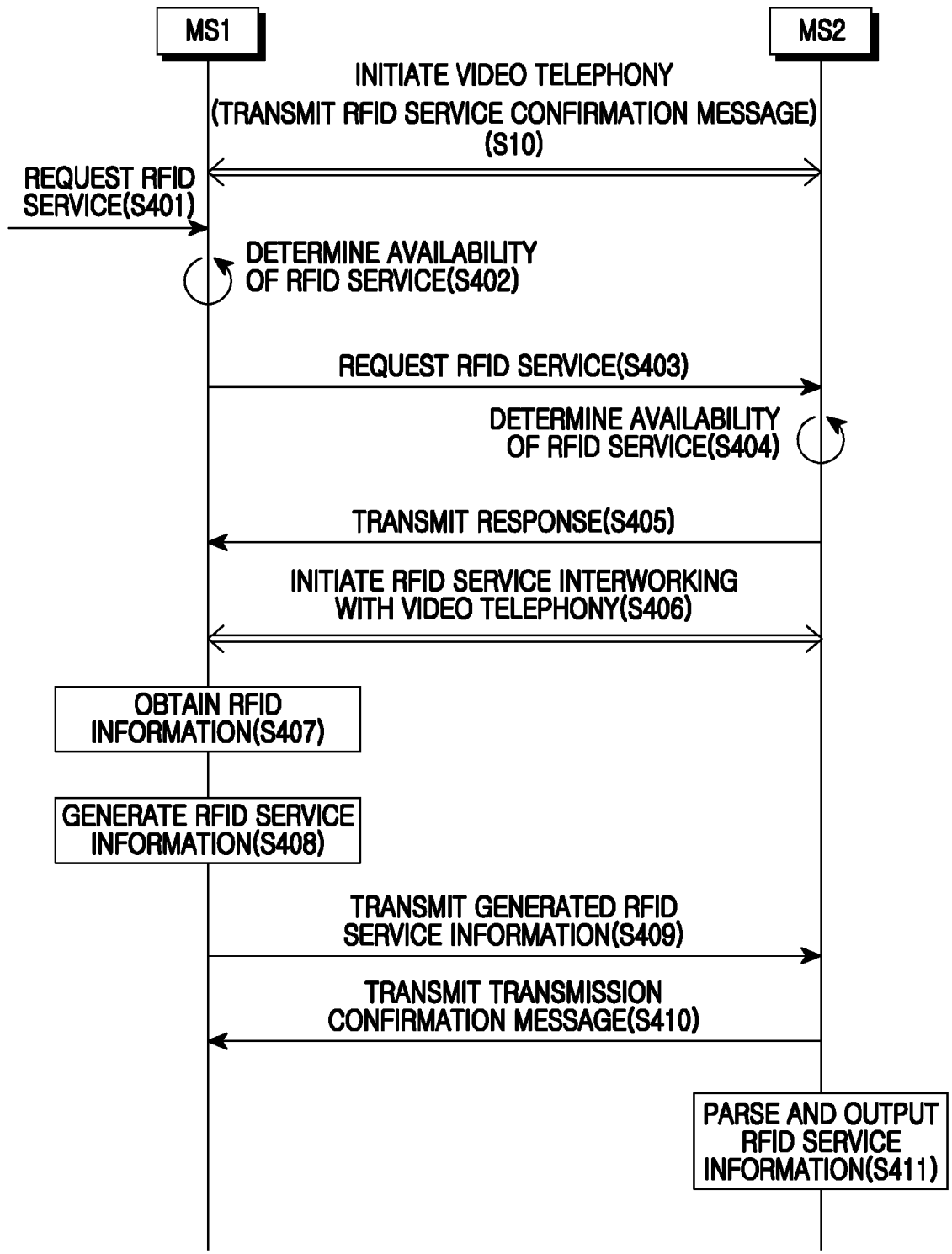
FIG. 4 is a flow diagram illustrating a method for an RFID service interworking with video telephony according to an exemplary embodiment of the present invention.

FIG. 4 is a flow diagram illustrating a method for an RFID service interworking with video telephony according to an exemplary embodiment of the present invention.

For convenience of explanation in FIG. 4, a transmitting mobile communication terminal (hereinafter, MS1) and a receiving mobile communication terminal (hereinafter, MS2) will be separately used in a network. Constitutional elements (e.g., a switch, etc.) of transmitting-side and receiving-side mobile networks may be either omitted in the following explanations or explained when necessary.

A video telephony initiation process between the MS1 and the MS2 will be described in brief. Upon attempting a video telephony call, the MS1 transmits an alerting signal to the MS2. After a connection between the MS1 and the MS2 is established, the video telephony is initiated between the MS1 and the MS2.

In the video telephony initiation process, the switch of the wireless network transmits an RFID service confirmation message by using one of messages transmitted to the mobile communication terminals. The RFID service confirmation message indicates whether each mobile communication terminal participating in the video telephony can use an RFID service of an exemplary embodiment of the present invention during video telephony. In order for the MS1 and the MS2 to use the RFID service interworking with video telephony, additional service registration may be required in advance.

Referring to FIG. 4, the RFID service is first registered as described above by the MS1 and the MS2 in order to use the RFID service interworking with the video telephony.

After registering the RFID service interworking with the video telephony, the video telephony is initiated through a specific process when the MS1 attempts a video telephony call in step S10. In step S10, the RFID service confirmation message is transmitted to each of the MS1 and the MS2 by the constitutional elements (not shown, e.g., the switch, etc.) of the wireless network.

The RFID service confirmation message may be various such as an access request message or an alerting message, which is transmitted from the switch to the MS1 and the MS2 in order to initiate the video telephony. The MS1 and the MS2 store the received RFID service confirmation message.

After the initiating of the video telephony, any one of the mobile communication terminals currently using the video telephony, for example, the MS1, selects a specific key to use the RFID service in step S401. Then, in step S402, the MS1 determines whether the RFID service interworking with the video telephony of an exemplary embodiment of the present invention is available by using the RFID service confirmation message received and stored.

If the RFID service is not available, the MS1 displays a message such as 'unsubscribed user', 'service is not available in this area', or the like.

In contrast, if it is determined that the RFID service is available in step S402, the MS1 transmits a request of the RFID service interworking with the video telephony to the MS2 in step S403.

In step S404, the MS2 determines whether the RFID service interworking with video telephony can be used by using the RFID service confirmation message received and stored in the video telephony initiation process. In step S405, the MS2 transmits a response message to the MS1 in response to the request for the RFID service interworking with the video telephony.

In step S406, if the response message received by the MS1 shows that the MS2 can use the RFID service interworking with video telephony in step S404, the RFID service interworking with video telephony of an exemplary embodiment of the present invention is initiated between the MS1 and the MS2.

The MS1 and the MS2 may transmit and receive the request message for the RFID service interworking with the video telephony and the response message thereof by using a User Input Indication (UII) message.

Although it has been described that the RFID service confirmation message is transmitted in step S401 and S404, the present invention is not limited thereto. Thus, the RFID service confirmation message may be transmitted at any time after step S10 by using any one of messages transmitted to the MS1 and the MS2.

In the above description, a service subscriber of the RFID service interworking with video telephony of an exemplary embodiment of the present invention is authenticated in such a manner in which, when a user requests the RFID service, an availability of the RFID service interworking with the video telephony is inquired to a counterpart mobile communication terminal and a response is received from the counterpart mobile communication terminal. However, the present invention is not limited thereto.

The RFID service interworking with the video telephony of an exemplary embodiment of the present invention may be provided by using the UII message. The UII message is defined in an H.245 protocol used for a channel allocation and circuit connection between the mobile communication terminals.

That is, after the video telephony initiation process, the RFID service request message and the response message thereof can be transmitted and received between the mobile communication terminals by using the UII message. Upon activating the RFID service interworking with the video telephony, each mobile communication terminal currently using the video telephony can transmit information obtained by the RFID module 102 of FIG. 1 to its counterpart mobile communication terminal by using the UII message.

If the RFID service interworking with video telephony is initiated between the MS1 and the MS2 in step S406, the MS1 obtains RFID information to be transmitted to the MS2 by using the RFID module of the MS1 in step S407.

In step S408, the RFID module of the MS2 generates RFID service information by parsing the obtained RFID information. In step S409, the generated RFID service information is transmitted to the MS2 by using a call control message. For example, if the generated RFID service information is text information, the information is transmitted to the MS2 by using the UII message defined in the H.245 protocol (i.e., H.245 call control message).

In step S410, the MS2 transmits a transmission confirmation message to the MS1.

Thereafter, in step S411, the MS2 parses and outputs RFID service information of the call control message (i.e., H.245 UII message) by using the RFID module.

Figure 5:
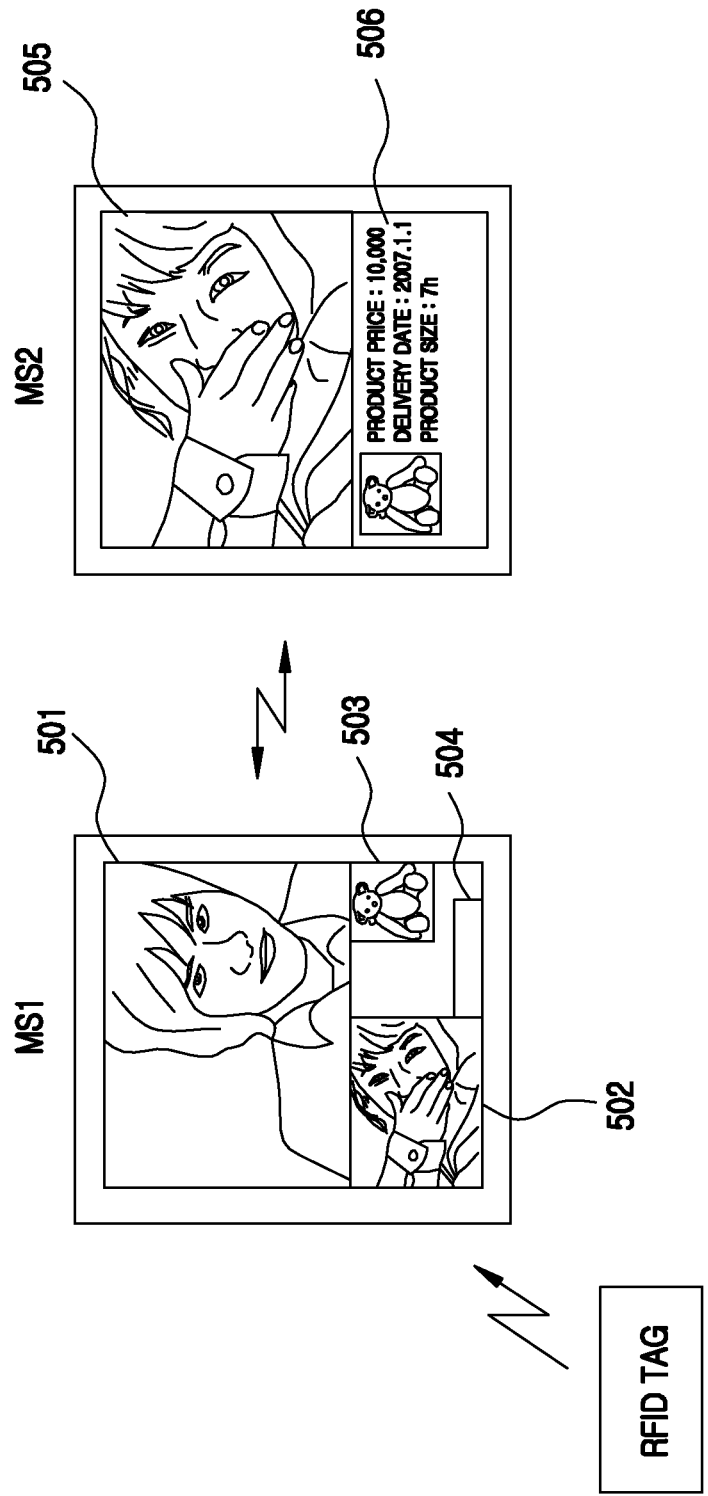
FIG. 5 illustrates an RFID service interworking with video telephony between mobile communication terminals according to an exemplary embodiment of the present invention.

FIG. 5 illustrates an RFID service interworking with video telephony between mobile communication terminals according to an exemplary embodiment of the present invention. The details described above with reference to FIGS. 2 to 4 will be omitted in the description of FIG. 5.

Referring to FIG. 5, the video telephony is performed between mobile communication terminals, i.e., an MS1 and an MS2.

One of the MS1 and the MS2, for example, the MS1 transmits RFID information to the MS2 by obtaining the RFID information from an RFID tag shown in FIG. 5 in order to receive the RFID service interworking with the video telephony of an exemplary embodiment of the present invention.

A display unit of the MS1 that transmits the RFID information displays an image 501 transmitted from the MS2 currently participating in the video telephony. In addition, the display unit of the MS1 displays an image 502 to be transmitted to the MS2 so that a user can transmit the image while viewing the image.

Information 503 obtained for the RFID service of an exemplary embodiment of the present invention is also displayed. A status 504 is also displayed to check a transmission status of the displayed information 503 being transmitted to the MS2.

The MS2 displays an image 505 transmitted from the MS1 and RFID service information 506 transmitted from the MS1.

According to exemplary embodiments of the present invention, a mobile communication terminal providing an RFID service interworking with video telephony and a method thereof are provided. Thus, it is possible to transmit additional information on a specific object image on a real time basis during the video telephony. In addition, necessary information can be delivered to a counterpart by obtaining the information using the conventional RFID service without having to directly report the information via a voice call between users.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A mobile communication system for providing a Radio Frequency IDentification (RFID) service interworking with video telephony, the system comprising:
a first mobile communication terminal for generating RFID service information by using RFID tag information and for transmitting the generated information to a second mobile communication terminal during video telephony between the first mobile communication terminal and the second mobile communication terminal, wherein the RFID service information is transmitted to the second mobile communication terminal by using a call control message for the video telephony between the first mobile communication terminal and the second mobile communication terminal; and
the second mobile communication terminal for parsing the RFID service information received from the first mobile communication terminal and for outputting the parsed RFID service information to a user of the second mobile communication terminal during the video telephony.

2. The system of claim 1, wherein the first mobile communication terminal determines whether the RFID service interworking with the video telephony is available by using an RFID service confirmation message received and stored.

3. The system of claim 2, wherein the second mobile communication terminal determines whether the RFID service interworking with the video telephony can be used by using the RFID service confirmation message received and stored in a video telephony initiation process, and transmits a response message to the first mobile communication terminal in response to a request for the RFID service interworking with the video telephony.

4. The system of claim 1, wherein the call control message includes an H.245 User Input Indication (UII) message.

5. A method of transmitting information obtained using an RFID during video telephony to a second mobile communication terminal currently participating in the video telephony, the method comprising:
performing an RFID service capable of sharing RFID information obtained during the video telephony between a first mobile communication terminal and the second mobile communication terminal;
generating the obtained RFID information as transmittable RFID service information; and
transmitting the generated RFID service information to the second mobile communication terminal for presentation to a user of the second mobile communication terminal during the video telephony,
wherein the RFID service information is transmitted to the second mobile communication terminal by using a call control message for the video telephony between the first mobile communication terminal and the second mobile communication terminal.

6. The method of claim 5, further comprising receiving a response message transmitted from the second mobile communication terminal in response to a request for the RFID service interworking with the video telephony.

7. The method of claim 5, further comprising determining whether the RFID service is available in the second mobile communication terminal currently participating in the video telephony.

8. The method of claim 5, wherein the call control message includes an H.245 UII message.

9. A mobile communication terminal for transmitting information obtained using an RFID during video telephony to a second mobile communication terminal currently participating in the video telephony, the terminal comprising:
an RFID module for receiving RFID tag information; and
a controller for performing an RFID service capable of sharing the RFID information obtained during the video telephony between the mobile communication terminal and the second mobile communication terminal, for generating the obtained RFID information as transmittable RFID service information, and for transmitting the generated RFID service information to the second mobile communication terminal during the video telephony between the mobile communication terminal and the second mobile communication terminal for presentation to a user of the second mobile communication terminal,
wherein the RFID service information is transmitted to the second mobile communication terminal by using a call control message for the video telephony between the mobile communication terminal and the second mobile communication terminal.

10. The terminal of claim 9, wherein the controller determines whether the RFID service interworking with the video telephony is available.

11. The terminal of claim 9, wherein the controller determines whether the RFID service is available in the second mobile communication terminal currently participating in the video telephony.

12. The terminal of claim 9, wherein the call control message includes an H.245 UII message to be transmitted.

13. A method of receiving RFID service information transmitted from a second mobile communication terminal participating in video telephony in a first mobile communication terminal, the method comprising:
- performing an RFID service capable of sharing the RFID service information of the second mobile communication terminal;
- receiving the RFID service information transmitted from the second mobile communication terminal during the video telephony between the first mobile communication terminal and the second mobile communication terminal, wherein the RFID service information is received from the second mobile communication terminal by using a call control message for the video telephony between the first communication terminal and the second communication terminal;
- parsing the received RFID service information; and
- outputting the parsed RFID service information to a user of the second mobile communication terminal.

14. The method of claim 13, further comprising transmitting a transmission confirmation message to the second mobile communication terminal.

15. The method of claim 13, wherein the call control message includes an H.245 UII message.

16. A mobile communication terminal for receiving RFID service information transmitted from a second mobile communication terminal participating in video telephony, the terminal comprising
- a controller for performing an RFID service capable of sharing the RFID service information of the second mobile communication terminal, for receiving the RFID service information transmitted from the second mobile communication terminal during the video telephony between the mobile communication terminal and the second mobile communication terminal, and for parsing and outputting the RFID service information, wherein the RFID service information is received from the second mobile communication terminal by using a call control message for the video telephony between the mobile communication terminal and the second mobile communication terminal; and
- a display unit for displaying the parsed RFID service information to a user of the second mobile communication device during the video telephony, under the control of the controller.

17. The terminal of claim 16, wherein the controller transmits a transmission confirmation message to the second mobile communication terminal.

18. The terminal of claim 16, wherein the call control message includes an H.245 UII message.

* * * * *